Figure 1:
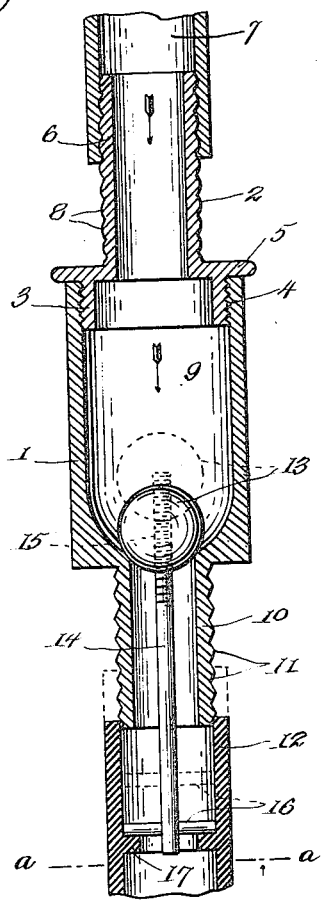

N. R. THOMPSON.
VALVE DEVICE.
APPLICATION FILED OCT. 4, 1912.

1,173,620.

Patented Feb. 29, 1916.

WITNESSES

INVENTOR
Nathan R. Thompson,
his Attorney

UNITED STATES PATENT OFFICE.

NATHAN R. THOMPSON, OF DAVENPORT, IOWA.

VALVE DEVICE.

1,173,620.

Specification of Letters Patent. Patented Feb. 29, 1916.

Application filed October 4, 1912. Serial No. 723,961.

*To all whom it may concern:*

Be it known that I, NATHAN R. THOMPSON, a citizen of the United States, residing at Davenport, in the county of Scott and State of Iowa, have invented new and useful Improvements in Valve Devices, of which the following is a specification.

My invention relates to a valve device especially adapted to be located in a hose or pipe intermediate a source of fluid supply and the outlet, usually the nozzle of a hose or pipe, and particularly adjacent the outlet so that the same may be operated by a workman from a point adjacent the outlet, to cut off the supply of fluid.

The invention is especially adapted for use in connection with structural iron or steel work or the like, where the same is used or located in the hose supplying air to a compressed air drill or hammer, between the nozzle or source of air supply, so that in case the working or operation of the drill or hammer is found to be faulty, the workman can cut off the supply of fluid by actuation of parts at the nozzle, and from the part of the building or structure upon which and where he is working, without the necessity of returning to the ground to shut off the air supply, or have someone else shut off the supply.

One object of the invention is to provide a device of this kind having a valve member that is maintained in open position by engagement with a suitable part or portion of the air hose or pipe.

Another object of the invention is to provide a device of such construction that the valve will automatically close upon the detachment of the hose having the valve engaging part referred to.

A further object of the invention is to provide a device of this kind that is of such a construction as permits the parts of the device to be readily disassembled or disconnected for cleaning or repair purposes.

Still further and minor objects will appear from the description following taken in connection with the accompanying drawings, wherein the preferred embodiment of my invention is shown.

In said drawings, like reference characters designate like parts throughout the several views thereof, and of said views:—

Figure 2:
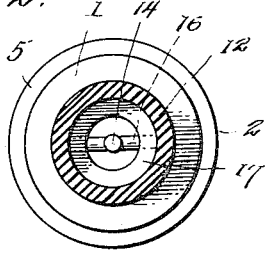

Figure 1 is a vertical or longitudinal sectional view through the device, showing the hose fragmentarily connected thereto, and, Fig. 2 is a cross sectional view on the line *a—a* of Fig. 1.

Referring to the drawings, 1 designates a valve chamber section and 2 designates a detachable bonnet. The bonnet section is provided with a gland or projection 3 having exterior screw threads adapted to engage interior screw threads as at 4, of the valve chamber section 1. A flange or rib 5 is provided on the bonnet 2 so as to limit the inward movement of the gland 3 into the section 1, and at the same time to form a close and tight joint therewith. If desired, suitable packing may be provided between the flange 5 and adjacent end wall of the section 1, as obvious. Section 2 as shown, is hollow and is provided with a stem 6 adapted to receive thereover a flexible pipe 7. To effect a better and tighter engagement of the flexible pipe with the stem, said stem is provided with ribs or the like 8.

The section 1 is provided with a chamber 9 and the wall of said chamber, at the base thereof, provides a seat for a valve to be hereinafter referred to. In the section 1 is provided a hollow stem 10 similar to the stem 6, and provided with ribs 11 similar to the ribs of said stem 6. On the stem 10 is adapted to be screwed or secured a flexible hose or pipe designated 12. It will be seen that the valve device couples or connects the pipes 7 and 12.

In the chamber 9 is seated at the base thereof, a valve 13 of any suitable material and shape, the same being shown as a ball. To said valve is removably connected a stem or rod 14 as by means of screw threads at 15. The rod 14 extends through the stem 10 and beyond the same is provided with a transverse pin or the like 16.

The pipe 12 is provided with an interior projection of any desired form adapted to operate in conjunction with and be in the path of the pin 16. Such a projection may be an interior flange such as 17. The engagement of pin 16 will limit the movement of the valve in either direction by its extending into the path of the stem 10 and projection 17, and its capability of abutment against such parts.

Referring now to the operation, the parts are shown in closed position in Fig. 1 in full lines. The device is connected in the pipe leading from a suitable source of fluid supply, and is preferably located adjacent the outlet end or nozzle of the pipe so as to always be readily accessible to the workman should he find it necessary or desirable to cut off the supply. The fluid passing through the pipes and device embodying my invention, follows the path or course described by the arrows in Fig. 1. In order to open the valve to permit the passage of the fluid therethrough, the pipe 12 is screwed upon the stem 10, and during such process, by reason of the engagement of the projection 17 with the pin 16, the valve 13 is moved from its seat, whereby fluid is free to pass through the device and pipes. The parts are shown in dotted lines in Fig. 1 in the position which they assume, when the valve is in open position. According to the extent to which the pipe 12 is screwed upon the stem 10, the supply of fluid may be regulated to any desired extent, as it will be seen that according to the extent of movement or engagement of the pipe 12 upon the stem 10 varies, the distance or extent of opening between the valve 13 and its seat varies. When it is found necessary or desirable to cut off the supply of fluid the pipe 12 is quickly detached from the stem 10, whereby the support for the valve 13 is removed, and the compressed air supply will act against the valve 13 and force the same tightly against its seat, and effectively cut off fluid supply.

In the course of time the valve 13 would wear away to some extent, and to this end the same has been provided so as to be removable when it is desired to substitute another valve in its place. To this end the valve 13 may be detached from the stem 14 by reason of the screw threaded connection at 15. Also the bonnet 2 has been made removable from the section 1 so that the bonnet may be removed in order to permit the valve 13 to be removed from the chamber 9.

As I have merely shown the preferred embodiment of the invention herein, it is to be understood that changes in the details of construction as set forth, may be made without departing from the spirit and scope of the appended claims.

Having thus described my said invention, what I claim and desire to secure by Letters Patent is:—

1. A device as specified including a valve chamber, a pipe adjustably associated with said chamber and provided with an annular flange on its inner periphery, a floating valve mounted for movement in said chamber having a stem extending therefrom into said pipe, a pin mounted in said stem in the path of said annular flange, whereby the valve is operated upon the actuation of said pipe, to open communication through the valve chamber.

2. A device of the character described including a valve chamber, one end of which is formed to provide a valve seat, a floating valve in said chamber adapted to normally lie on said seat, a stem detachably carried by said valve, said chamber provided with a screw-threaded tubular extension beyond said valve seat, a pipe adjustably mounted on said extension and provided with an annular flange on its inner periphery adjacent its jointure with said extension, and being in connection with said valve stem to raise the valve from its seat upon the actuation of said pipe to open communication through said chamber.

NATHAN R. THOMPSON.

Witnesses:
 JOSEPH P. LAKERS,
 JOHN P. MEUER.